United States Patent
Fuks et al.

(10) Patent No.: US 9,428,010 B2
(45) Date of Patent: Aug. 30, 2016

(54) FORGED HOLLOW AXLE AND METHOD FOR MAKING THE SAME

(75) Inventors: Leon Fuks, Angered (SE); Stefan Preijert, Göteborg (SE); Ingela Stjärnvy, Torslanda (SE)

(73) Assignee: Volvo Truck Corporation, Gothenburg (SE)

( * ) Notice: Subject to any disclaimer, the term of this patent is extended or adjusted under 35 U.S.C. 154(b) by 37 days.

(21) Appl. No.: 14/357,961

(22) PCT Filed: Nov. 1, 2011

(86) PCT No.: PCT/SE2011/000199
§ 371 (c)(1),
(2), (4) Date: Aug. 12, 2014

(87) PCT Pub. No.: WO2013/066219
PCT Pub. Date: May 10, 2013

(65) Prior Publication Data
US 2015/0130262 A1    May 14, 2015

(51) Int. Cl.
*B60B 35/08* (2006.01)
*B60B 35/00* (2006.01)
(Continued)

(52) U.S. Cl.
CPC .............. *B60B 35/003* (2013.01); *B21K 1/063* (2013.01); *B21K 1/12* (2013.01); *B60B 35/08* (2013.01); *B60B 2310/208* (2013.01); *B60B 2310/3023* (2013.01); *B60B 2360/145* (2013.01); *B60B 2900/311* (2013.01); *B60B 2900/551* (2013.01)

(58) Field of Classification Search
CPC ..... B60B 35/003; B60B 35/06; B60B 35/08; B60B 2310/208; B60B 2310/3023; B21K 21/06; B21K 21/063; B21K 21/12; B21K 1/063; B21K 1/12

USPC .............................. 301/124.1, 125, 127, 129
See application file for complete search history.

(56) References Cited

U.S. PATENT DOCUMENTS 1,721,695 A    7/1929 Hufferd et al.
2,685,479 A *  8/1954 Buckendale ............ B60B 35/08
                                                          301/124.1
(Continued)

FOREIGN PATENT DOCUMENTS

DE    102007025684    4/2008
FR    1490835 4       8/1967
WO    02076652 A1     10/2002

OTHER PUBLICATIONS

International Search Report (Jul. 4, 2012) for corresponding Intenrational Application PCT/SE2011/000199.
(Continued)

*Primary Examiner* — John Walters
(74) *Attorney, Agent, or Firm* — WRB-IP LLP (57) ABSTRACT

A forged hollow axle, particularly a steerable axle, is designed for a commercial vehicle. The axle has a main longitudinal extension in a y-direction, a width in an x-direction and a height in a z-direction and is composed of at least two half shells fixedly joined at an interface which extends along its longitudinal extension. A material thickness in one or both of the half shells is distributed in the main longitudinal extension and in one or both of width and height to provide a predetermined relation of a torsional stiffness and a bending stiffness in one or more spatial directions in one or more axle sections.

5 Claims, 7 Drawing Sheets (51) Int. Cl.
  *B21K 1/12*   (2006.01)
  *B21K 1/06*   (2006.01)

(56) References Cited

U.S. PATENT DOCUMENTS

| | | | |
|---|---|---|---|
| 2,911,262 A | 11/1959 | Franck | |
| 3,673,888 A | 7/1972 | Moll et al. | |
| 3,793,703 A | 2/1974 | Werner et al. | |
| 6,196,563 B1 | 3/2001 | Haycraft | |
| 6,585,331 B2* | 7/2003 | Varela | B60B 35/06 301/124.1 |
| 6,799,811 B1 | 10/2004 | Dauber et al. | |
| 7,325,821 B2* | 2/2008 | Myers | B60B 35/007 280/124.156 |
| 2006/0242835 A1* | 11/2006 | Fuks | B21K 1/06 29/897.2 |

OTHER PUBLICATIONS

International Preliminary Report on Patentability (Jan. 10, 2014)) for corresponding Intenrational Application PCT/SE2011/000199.
European Search Report (Dec. 23, 2015) from corresponding European App. EP 11 875 011.6.

* cited by examiner

FORGED HOLLOW AXLE AND METHOD FOR MAKING THE SAME

BACKGROUND AND SUMMARY

The invention relates to a forged hollow axle and a method for making the same.

WO 2004/108234 A1 discloses a forged hollow axle which is manufactured from two half shells prepared by press forging and joint along the longitudinal main extension of the axle. By modifying the cross sectional shape and/or by introducing ribs in the axle body torsional stiffness and bending strength can be improved compared to axles with massive axle bodies. For instance, in areas where a high torsional stiffness or resistance is desired, such as the swan neck areas of the axle, a more marked u-shape is generated in the half shells. The swan necks are arranged at the free ends of the front axle body which swan necks connect a pair of king pin supports to the central portion of the axle body. In other areas where great bending stiffness or resistance is desirable, transverse ribs are retained between the opposite vertical sides of the axle profile.

In U.S. Pat. No. 2,685,479 A a tubular axle beam is disclosed which is made of two forged preformed halves which are joined by a longitudinal weld.

It is desirable to provide a forged hollow axle with improved stiffness characteristics, particularly by providing a controlled relationship of bending stiffness and torsional stiffness of the axle.

It is also desirable to provide a method for making a forged hollow axle with improved stiffness characteristics.

A forged hollow axle is proposed, particularly a steerable axle, designed for a commercial vehicle, the axle having a main longitudinal extension in y-direction, a width in x-direction and a height in z-direction and being composed of at least two half shells fixedly joined at an interface which extends along its longitudinal extension. A material thickness d in one or both of the half shells is distributed in the main longitudinal extension and in one or both of width and height to provide a predetermined relation of a torsional stiffness and a bending stiffness in one or more spatial directions in one or more axle sections.

The invention allows, according to an aspect thereof, for a control stiffness distribution along the axle by distributing the material of the half shells in a desired way. The material can be distributed, by way of example, at least in two dimensions, particularly in all three dimensions. In a commercial vehicle, good handling properties of the vehicle, e.g. for bump travel and wind-up brake motion of the axle, and its front suspension installations are dependent on the suspension component stiffness such as the resistance of the leaf spring against, wind up ("wind-up stiffness") and reaction bushings and the like. A front axle itself affects it any ways the handling of the vehicle with its stiffness between the axle ends. The invention allows for good handling, properties both for air suspension and leaf spring suspension systems, particularly at front suspension systems. The known forged axles used today are optimized for strength and weight aspects instead and provide no means to create a stiffness variation which is favourable to optimize the handling of the vehicle except when increasing, weight and costs strongly.

Favourably, the torsional stiffness can be a predetermined percentage higher than the bending stiffness in the x-direction between the spring mounting positions on the vehicle, and/or the bending stiffness in z-direction can be a predetermined percentage higher than the bending stiffness in x-direction outside the spring positions, and the torsional stiffness can be a predetermined percentage higher than the bending stiffness in the x-direction outside the spring positions.

The material distribution in the half shells is generated by die forging. Particularly, hot die forging can be used.

Favourably, the material of the axle body can be distributed in at least two, particularly in all three dimensions, i.e. it is possible to generate thickness variations in x-, y-, and z-direction. A desired amount of material and material thickness can be generated at desired locations in the half shell. Die forging, in particular hot die forging, allows for a complete reshaping of the material in the axle, thus improving its material properties. Other than press forging or bending of corrugated material which already has some thickness variations prepared in the blank material, the die forged material has properties different from materials prepared by the other methods. In particular it can be observed in cross sectional cuts that the die forged material shows a multitude of fibre like structures which are created by alloyed material concentration variations generated during die forging. This causes an anisotropic material strength both depending on the direction with respect to the fibre and on the local density of the fibres in the fibre like structures. Areas with a higher density give rise to a higher strength even if the area is subject to stress concentration due to a radius such as a corner. A higher strength of the half shell and accordingly of the axle follows from this effect, thus allowing to prepare half shells with favourably thin walls along the z-direction. The stiffness of the half shell can be increased by moving as much material as possible out of relevant zones of the half shells which also yields an advantageous weight reduction of the half shell and the axle composed of such half shells.

According, to a favourable embodiment, the material distribution has an average thickness along an extension in z-direction which is lower than an average thickness along an extension in x-direction, which results in a favourable weight reduction as well as favourable stiffness relations concerning bending stiffness and torsional stiffness. Bending stiffness means a resistance the axle has against bending it about an axis in the x-direction or z-direction. Torsional stiffness (also called rotation stiffness) means a resistance the axle has against a rotation about an axis in y-direction.

According to a favourable embodiment, the material may be distributed so as to yield the torsional stiffness to be larger than the bending stiffness in x-direction in a middle section. Favourably, the axle provides better handling properties when driving over a bump or at wind-up when braking. The general advantage is that both the torsional stiffness and the bending stiffness around the z-axis get, much higher with a tubular cross section even with a reduction of material volume and weight. A relation between the stiffnesses are the one found from an appropriate analysed model and is typically similar even after further optimisation loops for a final product.

According to a favourable embodiment, the material distribution may be established so as to yield the bending stiffness in z-direction to be similar with the bending stiffness in x-direction in a side section outside the middle section.

Favourably, the axle provides better handling properties when driving over a bump or at wind-up when braking. An advantage is that the steering geometry can be adapted for the suspension characteristics with minimum of effects from the stiffness of the axle.

According to a favourable embodiment, the half shells may be joined by flash-butt welding. Flash-butt welding avoids substantial damage to the material of the half shells. The joint which is achieved with this technique is essentially as strong as the parent material of the half shells without the aid of any filler material. Impurities and oxides are pushed out of the weld zone so that the inner weld material is sound and free of oxides or cast material.

According to a favourable embodiment, the torsional stiffness and the bending, stiffness may differ at least by a factor of 1.5, particularly at least by a factor of 2. A good roll steer effect can be achieved. Important stiffness characteristics can be increased locally for a robust suspension design, favourably for a robust front suspension design.

According to a favourable embodiment, the middle section may be arranged between spring positions of the axle and/or the side section may be a swan neck section of the axle. Favourable steering and handling properties can be achieved for the axle.

According, to a favourable embodiment, the axle may have a design of a steerable axle comprising king pin receptacles at its free ends, and by a design of a non-drivable axle or an axle drivable by individual wheel drives.

According to a favourable embodiment, the axle may have a design of a front axle. Front steering handling can be improved both for bump handling and brake wind-up handling.

Further, a method is proposed for manufacturing a forged hollow axle, particularly a steerable axle, characterized by the steps of preparing a first half shell and a second half shell by die forging to establish a material distribution which yields a material thickness in one or both half shells to provide a predetermined relation of a torsional stiffness and a bending stiffness in one or more spatial directions in one or more axle sections; and
   joining the half shells by flash-butt welding for maintaining the material properties of the half shells after welding.

The half shells can be manufactured with well defined properties which result in superior stiffness properties and reduced weight. The joining technique of the half shells can be performed automated and computer controlled which results in a high and reliable output of axles, particularly steerable front axles tier both leaf spring and air spring systems. The material properties of the half shells and/or the axle can be derived form model calculation as is usual in the art.

Further, a vehicle comprising a forged steerable hollow axle is proposed. The vehicle provides good handling properties due to the improved stiffness of the axle, particularly the steerable front axle.

Generally, the invention allows an advantageous increase of the torsional stiffness (rotation about the y-direction) with e.g. 200% at the axles swan neck section, compared to massive forged axles. As a result, a steering error at both bump and brake handling can be reduced as well as a robust steering behaviour be achieved which is independent of the axle's swan neck height. Thus, the needed steering geometry variation can be simplified and the number of components at large variations on axle geometry and installation heights can be reduced.

BRIEF DESCRIPTION OF THE DRAWINGS

The present invention together with the above-mentioned and other objects and advantages may best be understood from the following detailed description of the embodiment(s), but not restricted to the embodiments, wherein is shown schematically.

DETAILED DESCRIPTION

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

Figure 1:
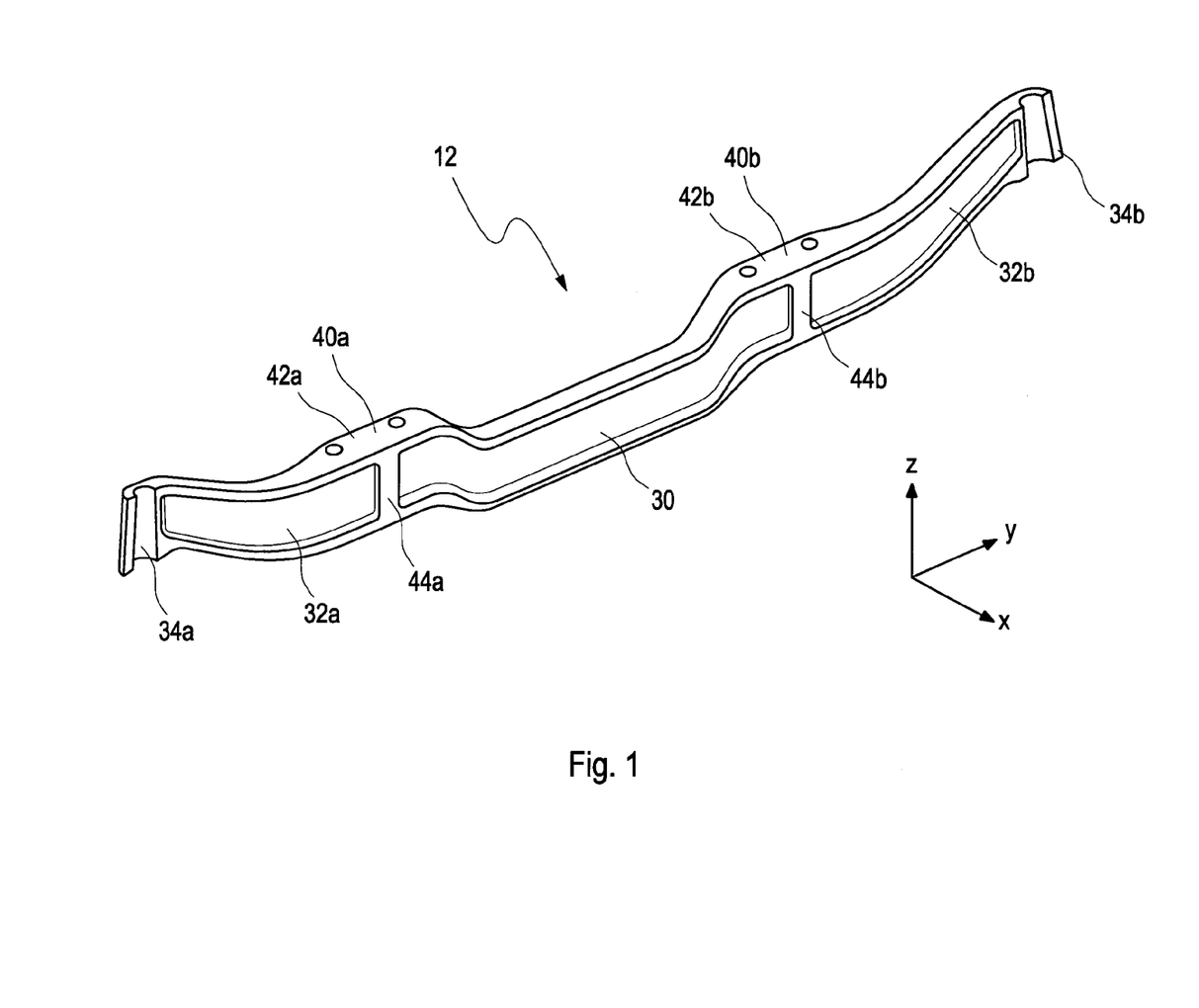
FIG. 1 in a perspective view an example embodiment of a half shell of a steerable front axle according to the invention.

FIG. 1 depicts in a perspective view an example embodiment of a half shell 12 of a steerable front axle according to the invention. The axle is preferably designed for a commercial vehicle such as a truck. The half shell 12 has a main longitudinal extension in y-direction y, a width in x-direction x and a height in z-direction z. The axle (not shown) is composed of two such half shells 12 (referred to as 12a, 12b in FIGS. 2b and 2c) fixedly joined at an interface which extends along its longitudinal extension y, thus forming a hollow axle.

The half shell 12 has a middle section 30 and an end section 32a, 32b embodied as swan neck section at each side of the half shell 12 which ends in half receptacles 34a, 34b intended for supporting a king pin at each side of the axle. The middle section 30 and the end sections 32a, 32b are connected via a transition section 40a, 40b. The transition section 40a, 40b is embodied as a spring plate 42a, 42b for mounting an air bellows of an air spring system or a leaf spring of a leaf spring system to the axle, for instance. The half shell 12 exhibits a predominantly U-shape profile. Below the spring, plates 42a, 42b a web 44a, 44b may be arranged for reinforcing the strength of the half shell 12 at this location.

A material thickness in the half shell 12 distributed in the main longitudinal extension y and in one or both of width x and height z to provide a predetermined relation of a torsional stiffness and a bending stiffness in one or more spatial directions x, y, z in one or more axle sections 30, 40a, 40b, 32a, 32b.

In the middle region 30 the hollow axle 10 allows in one embodiment an increase of the torsional stiffness of at least 250% compared to a massive, double-T-shaped axle. In the end region 32a, 32b, the hollow axle 10 allows in one embodiment an increase of torsional stiffness of at least 200% compared to a massive, double-T-shaped axle.

For instance, the stiffness parameters k ratios in x, y, and z-direction are in one embodiment as follows:

In the middle region 30, Ky/Kx=1.5 and Kz/Kx=0.5 for a standard massive axle, whereas Ky/Kx=2 and Kz/Kx=1 for a hollow axle according to the invention.

In the end region 32a, 32b, Ky/Kx=1.5 and Kz/Kx=0.6 for a standard massive axle, whereas Ky/Kx approaches 2 and Kz/Kx approaches 1 for a hollow axle according to the invention.

Figure 2:
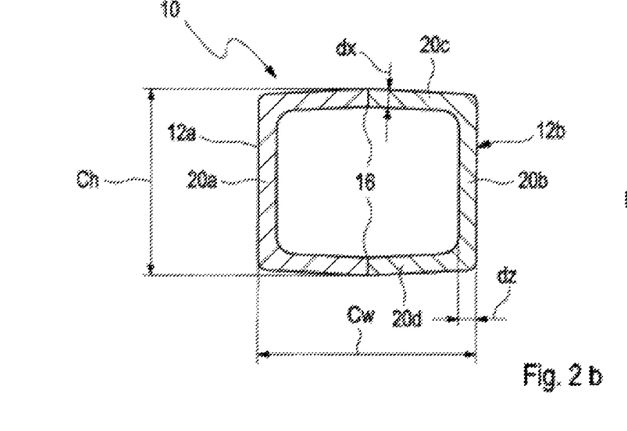
FIG. 2a-2c a front view of an axle composed of two half shells shown in FIG. 1 (FIG. 2a), a cross section of a middle section of the axle (FIG. 2b), and a cross section of the axle in a swan neck area (FIG. 2c)
Figure 2A:
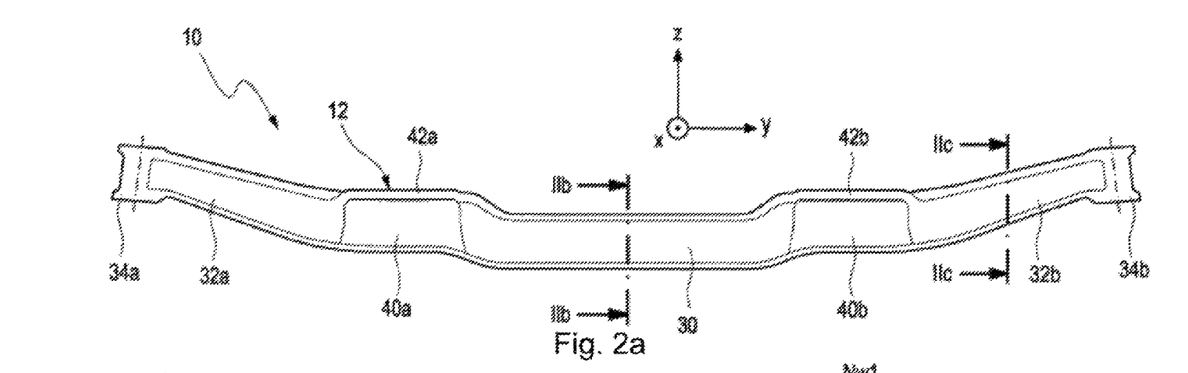

FIGS. 2a, 2b and 2c display a front view of the axle 10 composed of two half shells 12a, 12b shown in FIG. 1, a cross section of the middle section 30 of the axle 10, and a cross section of the axle 10 in an end section 32.

As can be seen in FIG. 2b, the axle 10 shows in the middle section 30 a nearly rectangular cross section with an overall height Ch and an overall width Cw, with side walls 20a, 20b which extend in the z-direction and an upper wall 20c and a lower wall 20d which extend in the x-direction. The average thickness dz of the side walls 20a, 20b is smaller than the average thickness dx of the upper and lower side walls 20c, 20d. The upper and lower walls 20c, 20d are slightly inclined from their outer edges towards the middle and have a maximum in height in the middle of each wall 20c, 20d. The half shells 12a, 12b are joint at an interface 16 at the upper and lower walls 20c, 20d, which interface 16 is arranged in the height maximum of the upper and lower walls 20c, 20d.

At the end section 32a, 32b, the cross section of the axle 10 has a broader upper wall 20c with an overall width Nw1 and a shorter lower wall 20d with an overall width Nw2 and an overall height Nh. The side walls 20a, 20b are bent outward according to the different lengths of the upper and lower walls 20c, 20d. Again, the average thickness dz of the side walls 20a, 20b is smaller than the average thickness dx of the upper and lower side walls 20c, 20d.

It should be noted that the material thickness is non-uniform along the y-direction as well as along the x-direction and the z-direction. This non-uniformity in thickness can be generated by die forging of the half shells 12a, 12h in a well controlled manner. The two half shells 12a, 12b are joined by way of flash butt welding.

Figure 3:
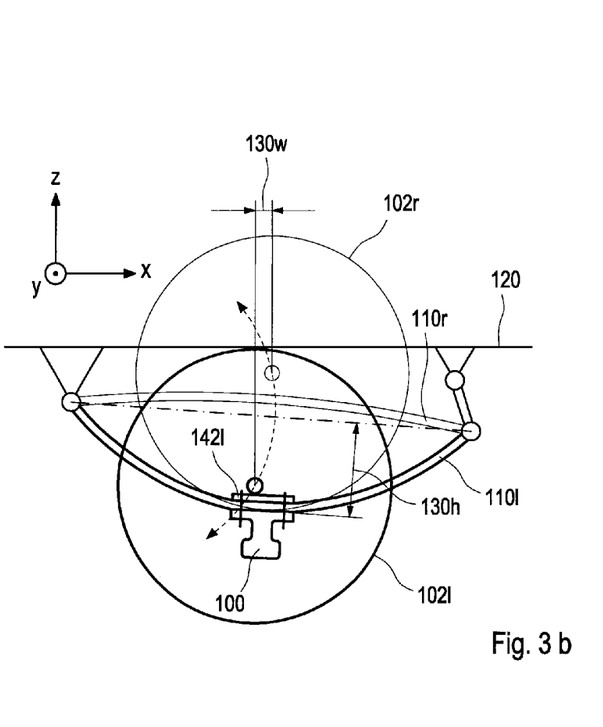
FIG. 3a, 3b a perspective view of the half shell of FIG. 1 (FIG. 3a) and roll movement effects of prior art system (FIG. 3b)

FIG. 3a depicts a perspective view of the half shell of FIG. 1. FIG. 3b shows roll movement effects of prior art system comprising a conventional massive forged axle 100 mounted to a frame body 120 of a vehicle. The axle 100 is connected to a leaf spring 1 10l at the left side and 1 10r at the right side via its spring plate (only the spring plate 142l on the left side is shown). As can be seen, the left and right wheels 102l and 102r can have a large difference in camber height 130h as well as a large difference in longitudinal movement 130w due to the deformation of the axle 100. Axle steering is in this example created by a downward bent leaf spring 1 10 with a large camber height 130h. Due to the different lateral movement of the axle 100 between the left and tight spring, plates 142l the axle body is rotated about the z-direction to give axle steering (seen by the longitudinal movement 130w) when a roll movement, i.e. a rotation about the x-direction is present.

The torsional stiffness between the spring plates 142 have a big influence on the roll movement handling due to that the suspension of leaf springs (or air suspension, reaction rods or trailing arms) will introduce high torques in this area. The torques will deform the known forged axle 100 so that it will reduce the under steering effect from axle steering. The largest effects are usually observed on axles with a high swan neck. By using the inventive forged hollow axle 10 it is possible to increase the torsional stiffness (y-rot), e.g. about 250%, which advantageously maintains more of the desired under steering effects from the axle steering, hence increasing roll steering.

Figure 4:
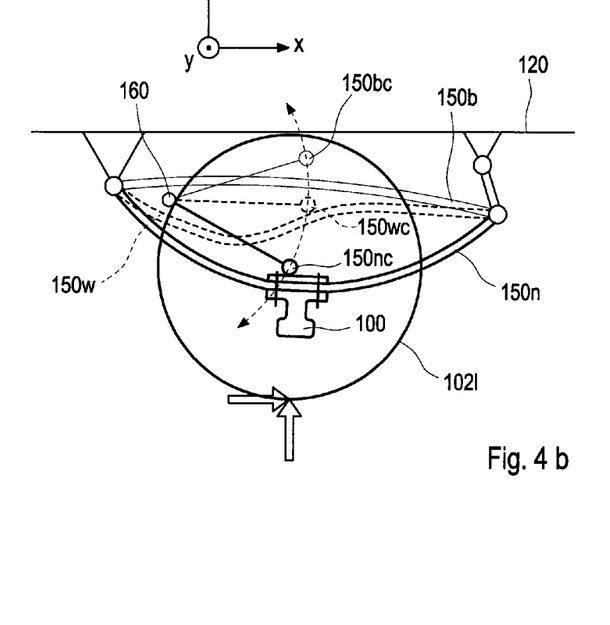
FIG. 4a, 4b a perspective view of the half shell of FIG. 1 (FIG. 4a) and wind-up brake and bump travel motion of a prior art system (FIG. 4b)

FIG. 4a shows a perspective view of the half shell of FIG. 1. FIG. 4b depicts a wind-up brake and bump travel motion of a prior art system.

When optimizing the steering geometry to minimize steering error at bump and brake handling the typical front suspensions leaf spring, air spring etc.) all show a specific wind-up centre 150wc and rotation point 160, from axle travelling at bump and brake handling. As can be seen in FIG. 4b, point 150bc indicates the top position of the wind-up centre of the leaf spring when driving over a bump with one wheel 102l, with 150b being the leaf spring during bump handling and 150n being the leaf spring during normal driving. Reference numeral 150w indicates a wind-up movement of the leaf spring with 150wc being the wind-up centre, i.e. a rotation centre, of the leaf spring during braking. The broad vertical arrow indicates a force introduced by a bump, the thin horizontal arrow indicates a brake motion.

With this knowledge the steering linkage is easy to optimize, but the axle body's internal stiffness has to be considered. Advantageously, the hollow axle 10 according to the invention gives possibilities to increase the torsional stiffness (y-rot) with at least 200% at the end section 32a, 12b (i.e. swan neck region). This advantageously increases the possibility to minimize steering errors at both bump and brake handling and provides a robust behaviour which is not depending on the swan neck height, as is the case for conventional axles.

Hence, the axle according to the invention allows for a robust steering behaviour at bump and brake handling.

Figure 5:
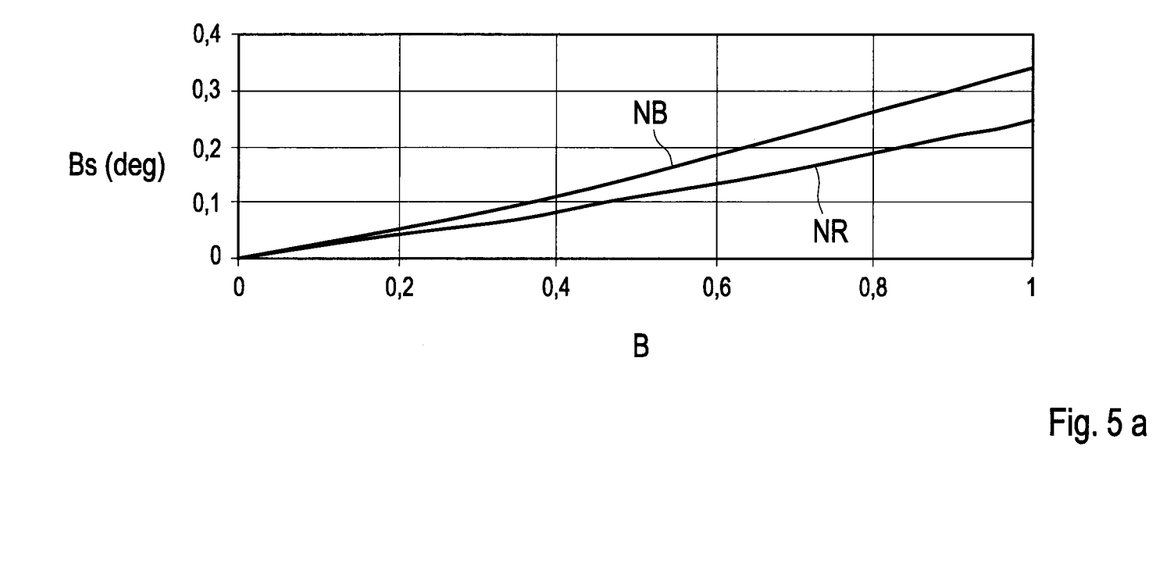
FIG. 5a, 5b a characteristic showing the improvement in brake pulling reduction as a function of brake sequence (FIG. 5a) and (FIG. 5b) roll steering behaviour as a function of axle roll angle according to the invention.

FIGS. 5a and 5b depict characteristics showing the improvement in brake pulling reduction Bs in degrees as a function of brake sequence B (FIG. 5a) and roll steering behaviour Rs in degrees as a function of axle roll angle A in degrees (FIG. 5b).

As can be seen in FIG. 5a as a characteristic response then using a forged axle according to the invention, a side pulling when braking is reduced, in total (in this example) by 0.6 (brake sequence 60%), resulting from 0.25 deg from an axle neck bending displayed by curve NB and from 0.35 deg from rotation NR of the axle end section (swan neck)

FIG. 5b illustrates an increased under steering of the axle. An axle roll angle Aa between ±4 deg gives in general about the double of the under steering angle for a hollow axle according, to the invention (curve R10) and a conventional axle (curve R100).

Figure 6:
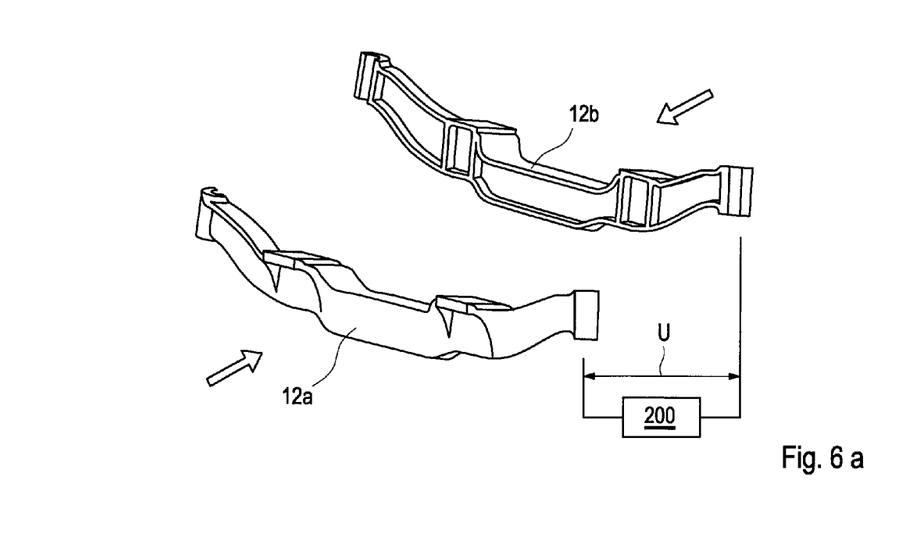
FIG. 6a, 6b steps of a joining process of two half shells for forming a hollow axle according to the invention.

FIGS. 6a and 6b illustrate steps of a joining process of two half shells 12a, 12b for forming a hollow axle 10 according to the invention.

Two half shells 12a, 12b are formed by die forging where material in the half shells is distributed in a defined way. The two half shells 12a, 12b are turned to face each other with their open sides and are clamped into fixtures which are connected to a welding transformer 200. One of the clamp fixtures is mounted on a slide which is programmed to move towards the stationary clamp fixture at a controlled rate. While the clamp fixture is moving, the transformer 200 is energized and the two half shells 12a, 12b touch. The electrical current applied to the half shells 12a, 12b generates a flashing or arcing across the interface of the two butting ends of the half shells 12a, 12b. The flashing action increases to the point of bringing the material of the half shells 12a, 12b at the interface to a plastic state. At the proper temperature the slide driving the clamp fixture rapidly accelerates, forging the half shells 12a, 12b to form a joint essentially as strong as the parent metal without the aid of any filler material. The melted metal and impurities are forced out of the welding zone so that the inner material at the joint is solid and free of oxides or cast metal. The forces required for flash-butt welding are established by the forge strength of the materials being welded.

Advantageously, using a hollow forged axle provides increased important stiffness characteristics in a defined and locally varying way for a robust from suspension design. Due to the improved stiffness characteristics, it is also possible to increase the control of under steering and over steering effects at roll handling as well as minimizing steering errors from bump and brake handling. Further the necessary geometry variations and number of components at big variations of axle geometry and installation heights can be simplified. The invention is particularly useful for trucks with steered axles.

The invention claimed is:

1. A axle designed for a commercial vehicle, the axle being a forged hollow axle and having a main longitudinal extension in y-direction, a width in x-direction and a height in z-direction and being composed of at least two half shells fixedly joined at an interface which extends along a longitudinal extension of the axle, wherein a material thickness in one or both of the half shells is distributed in the main longitudinal extension and in one or both of width and height to provide a predetermined relation of a torsional stiffness and a bending stiffness in one or more spatial directions (x, y, z) in one or more axle sections, wherein the material distribution in the half shells is generated by die forging, wherein the material distribution has an average thickness along an extension in z-direction which is lower than an average thickness along an extension in x-direction.

2. The axle according to claim 1, wherein the material distribution in the half shells is generated by hot die forging.

3. The axle according to claim 1, wherein the material is distributed so as to yield the torsional stiffness to be larger than the bending stiffness in x-direction in a middle section.

4. The axle according to claim 1, wherein the material distribution is established so as to yield the bending stiffness in z-direction to be larger than the bending stiffness in x-direction in a side section outside the middle section.

5. The axle according to claim 1, wherein the half shells are joined by flash-butt welding.

* * * * *